United States Patent

Miano et al.

Patent Number: 5,489,574
Date of Patent: Feb. 6, 1996

[54] CEMENTITIOUS COMPOSITION FOR THE CEMENTATION OF OIL WELLS

[75] Inventors: Fausto Miano, Enna; Giuseppe Calloni, Milan; Nevio Moroni, Nerviano; Armando Marcotullio, San Donato Milanese, all of Italy

[73] Assignees: Eniricerche S.p.A.; Agip S.p.A, both of Milan, Italy

[21] Appl. No.: 276,803

[22] Filed: Jul. 18, 1994

[30] Foreign Application Priority Data

Jul. 29, 1993 [IT] Italy .................. MI93A1702

[51] Int. Cl.$^6$ .................. C09K 7/00; C04B 18/06
[52] U.S. Cl. .................. 507/203; 507/269; 507/140; 507/906; 106/705; 106/707; 106/709; 166/285; 166/293
[58] Field of Search .................. 507/140, 269, 507/203; 106/700, 705, 707, 708, 709; 166/285, 293

[56] References Cited

U.S. PATENT DOCUMENTS

| 3,376,146 | 4/1968 | Mitchell . | |
|---|---|---|---|
| 4,200,153 | 4/1980 | Gallus . | |
| 4,391,329 | 7/1983 | Gallus . | |
| 4,452,638 | 6/1984 | Gallus | 106/97 |
| 4,556,109 | 12/1985 | Eilers . | |
| 4,721,160 | 1/1988 | Parcevaux et al. | 166/293 |
| 5,114,597 | 5/1992 | Rayborn et al. | 507/126 |

FOREIGN PATENT DOCUMENTS

| 0183296 | 6/1986 | European Pat. Off. . |
| 0379749 | 8/1990 | European Pat. Off. . |

OTHER PUBLICATIONS

Database WPI, Section Ch, Week 8240, Derwent Publications Ltd., London, GB, AN 82–85252E, & SU–A–885 539 (Seryakov A S) Nov. 30, 1981, "Oil Gas Well Plug Solution Contain Mineral Bind Carbon & Black Manufacture Waste".

Primary Examiner—Philip Tucker
Assistant Examiner—Joseph D. Anthony
Attorney, Agent, or Firm—Oblon, Spivak, McClelland, Maier & Neustadt

[57] ABSTRACT

A cementitious composition for oil well cementation able to prevent fluid migration comprises water, hydraulic cement, surfactant or organic dispersant, and carbon black.

10 Claims, 5 Drawing Sheets

CEMENTITIOUS COMPOSITION FOR THE CEMENTATION OF OIL WELLS

This invention relates to a cementitious composition for the cementation of oil wells, which is able to prevent fluid migration.

Fluid migration is a known phenomenon manifested as the migration of gas into the cemented interspace in a well when the well passes through a pocket of gas under pressure. In particular, this migration occurs during the setting of the cementitious composition injected between the well wall and the lining pipe, when the hydrostatic pressure of the cement column is unable to balance the gas pressure. Under these circumstances the gas migrates through the cement or into the space between the cement and the well walls, to create a multiplicity of channels which may reach the well surface. Fluid migration is also accentuated by contraction of the cement and possibly by loss of liquid from the cementitious composition by filtration into the surrounding formation, especially if porous.

In conclusion, fluid migration can lead to weakening of the cement, to reduced productivity and to surface safety problems. To minimize fluid migration, the known art uses the addition of particular additives to the cement mortars, and more specifically surfactants (U.S. Pat. No. 3,926,257), silica (U.S. Pat. Nos. 4,993,031, 5,149,370 and Re. No. 32,742) and polymer lattices (U.S. Pat. Nos. 4,537,918, 4,721,160 and 4,767,460). In particular, with the diffusing gas the surfactants should produce a foam able to form a barrier to further gas diffusion. In the case of polymer lattices, at adequate temperature these should form a gelatinous film which hinders gas movement. Finally, silica in microparticle form acts by filling the voids left by the cement granules, which are of larger particle size, so again hindering gas movement. These are however relatively costly materials, the effectiveness of which is not always completely satisfactory. In particular, silica is not completely inert to water and consequently reduces the quantity of water available for cement hydration. It has now been found that the addition of carbon black to cementitious compositions used for oil well cementation results in a number of unexpectedly good advantages. It has been found in particular that the addition of carbon black completely or substantially completely prevents fluid migration. It also acts in itself as a filtrate reducer with improved activity compared with formulations using silica. Having no pozzolanic properties, the carbon black can be added to the cement and water mixture without reducing the quantity of water available for cement hydration.

In addition carbon black does not substantially change the pumpability time of the cementitious composition, so allowing complete freedom in the use of possible setting accelerants or retardants, on the basis of operational requirements. Finally, carbon black is an inert material, and is available in large quantity at low cost.

In accordance therewith the present invention provides a cementitious composition for the cementation of oil wells, able to prevent fluid migration, comprising water, hydraulic cement and carbon black, this latter dispersed with the aid of a surfactant or dispersant, preferably a dispersant and more preferably a sulphonated dispersant, the carbon black quantity varying from 2 to 20 parts per 100 parts of the hydraulic cement w/w. Carbon black suitable for the purposes of the present invention can be any carbon black known in the art, for example: furnace black such as types (ASTM) SAF, ISAF, HAF, FF, FEF, APF, GPF and SRF; gas black such as type (ASTM) EPC; thermal black such as type (ASTM) FT; and lamp black such as the ASTM type similar to SRF. These carbon blacks generally have an average particle size (diameter) from about 10 to about 200 nm with narrow size distribution, a BET surface area from about 10 to about 155 $m^2/g$, and a DBP absorption from about 65 to about 125 ml/100 g.

Preferred carbon blacks for the present purposes have an average particle size from about 60 to about 200 nm and a BET surface area from about 15 to about 40 $m^2/g$.

The surfactant can be chosen from the usual surfactants well known to the expert of the art pertaining to the various classes of anionic, cationic and non-ionic surfactants.

The anionic surfactant class includes sulphates of fatty alcohols, sulphates of polyethoxylated fatty alcohols, ethoxylated alkylphenol sulphates, $C_{10}$–$C_{20}$ aliphatic sulphonates, alkyl aromatic sulphonates, petroleum sulphonates and carboxylated ethoxylates.

The cationic surfactant class includes quaternary ammonium salts. The non-ionic surfactant class includes phosphoric esters of ethoxylated fatty acids, alkoxylated fatty alcohols, alkylene oxide/propylene glycol condensation products and alkoxylated sorbitol esters. Suitable alkoxylating agents are ethylene oxide and propylene oxide.

The surfactant is preferably chosen from non-ionic surfactants. Dispersants can be chosen from non-ionic and anionic dispersant. Non-ionic dispersants include polyethoxylated phenols with more than 30 —$CH_2CH_2O$— units, polyethylenglycols with more than 30 —$CH_2CH_2O$— units, and polyethylene-polypropyleneglycols containing mainly —$CH_2CH_2O$— units.

Anionic dispersants, particular sulphonated dispersants, are however preferred for forming the composition of the present invention.

The said sulphonated anionic dispersants can be defined on the basis of certain basic characteristics:

A) sulphur content at least 10%;

B) solubility in water at 20° C. at least 15 wt. %;

C) lowering of water surface tension at 1 wt. % concentration not greater than 10%.

The aforedefined sulphonated anionic dispersants include condensates of naphthalenesulphonic acid with formaldehyde, products deriving from oxidative $SO_3$ sulphonation of fuel oil from steam cracking described in EP-A-379,749, dispersants deriving from sulphonation of indene or its mixtures with aromatics, described in EP-A-580 194 sulphonated dispersants deriving from indene-cumarone resins, described in IT-A-MI 93 A00701 of Aug. 4, 1993, and sulphonates deriving from oligomerization of fuel oil from steam cracking followed by sulphonation of the oligomers obtained.

The composition of the present invention can be prepared by various methods.

According to one embodiment of the present invention, the aqueous dispersion of carbon black in water formulated in the presence of a surfactant or a dispersant is dried, for example spray dried, to obtain a wettable carbon black, ie in the form of a solid easily dispersible in the other constituents of the cementitious composition. The carbon black containing the surfactant or dispersant initially present in the aqueous dispersion is then added (or vice versa) to the mixture of water and cement.

In a further embodiment, carbon black is added under agitation to the mixture of cement, water and surfactant or dispersant.

In the preferred embodiment, the carbon black is dispersed in water with the aid of a surfactant or dispersant, preferably a dispersant and more preferably a dispersant pertaining to the sulphonated anionic dispersant class. The dispersion of carbon black in water prepared in this manner is then added to the water/cement mixture.

The use of a dispersant avoids (or at least reduces) the need for a fluidifying additive normally used in formulating pumpable fluid cementitious pastes.

In the present description the term "hydraulic cement" or "cement" means those cements normally known as Portland cements such as ordinary Portland cement or rapid or extra-rapid hardening Portland cement; or modified Portland cements such as those resistant to sulphate; cements commonly known as high-alumina cements; high-alumina and calcium aluminate cements; and the same cements further containing small quantities of accelerants or retardants or air entrainment agents, or Portland cements containing secondary constituents such as blown ash, pozzolan or the like.

As the cement is in the form of particles of micron size, and typically with an average size of about 10–20 microns, the carbon black incorporated into the compositions of the present invention has a particle size of about two or three orders of magnitude less than the cement.

The cementitious compositions according to the present invention have a ratio of water to cement generally varying from 0.40 to 0.55 and preferably from 0.45 to 0.50, a carbon black content generally varying from 2 and 20 parts and preferably from 3 to 5 parts per 100 parts of cement w/w, and a surfactant or dispersant content from 2 to 10 and preferably from 7 to 9 parts per 100 parts of carbon black w/w.

The cementitious compositions of the present invention can contain further additives known in the art, and in particular filtrate reducers, setting retardants, antifoaming agents and dispersants for reducing the viscosity of the cementitious composition. The filtrate reducers can be chosen from lignin or lignites carrying grafted branch groups such as 2-acrylamido-2-methylpropanesulphonic acid, acrylonitrile, N,N-dimethylacrylamide, acrylic acid and N,N-dialkylaminoethylmethacrylate; products of the reaction between polyethyleneimine and sulphonated organic compounds; and salts of polymers or copolymers of 2-acrylamido-2-methylpropanesulphonic acid and N,N-dimethylacrylamide.

The filtrate reducers are usually present in the cementitious composition in a quantity of between about 0.25 and 5 parts per 100 parts of cement w/w.

The setting retardants can be chosen from lignosulphonates, borates, organic acids such as gluconic and citric acid, and copolymers of 2-acrylamido-2-methylpropanesulphonic acid with acrylic acid. These retardants, when used, are normally present in a quantity of between 0.1 and 5 parts per 100 parts of cement w/w.

Other additives which can be present in the cementitious compositions of the present invention are antifoaming agents and dispersants able to reduce the composition viscosity. Antifoaming agents suitable for the purpose are silicone polymers or polyglycols of medium molecular weight ($10^4$–$10^5$). Dispersants (also known as fluidifiers) suitable for the purpose are sulphonated naphthalene condensed with formaldehyde or the like. If the carbon black is dispersed with a dispersant, there is no need to add the fluidifier to the cementitious composition. These agents, when used, are generally present in the compositions in a quantity of the order of 0.5–3 parts per 100 parts of cement w/w.

Finally, the compositions can contain inert weighting materials. According to a further aspect, the present invention provides a method for the cementation of an oil well, consisting of positioning the aforedescribed cementitious composition within the interspace between the well wall and the lining pipe and causing it to harden therein.

Advantageously, cementation using the cementitious compositions of the present invention completely or substantially eliminates fluid migration and reduces filtrate loss over a wide temperature range. In addition the hardened cements exhibit low contraction and good mechanical characteristics, such as compression strength.

In the accompanying drawings:

FIG. 1 schematically represents the gas flow apparatus used for determining-gas migration;

The following examples are provided to better illustrate the present invention.

In said examples:

The mortars were prepared in accordance with API SPEC 10 (5th Edition, 1 Jul. 1990), section 5.

Figure 1:
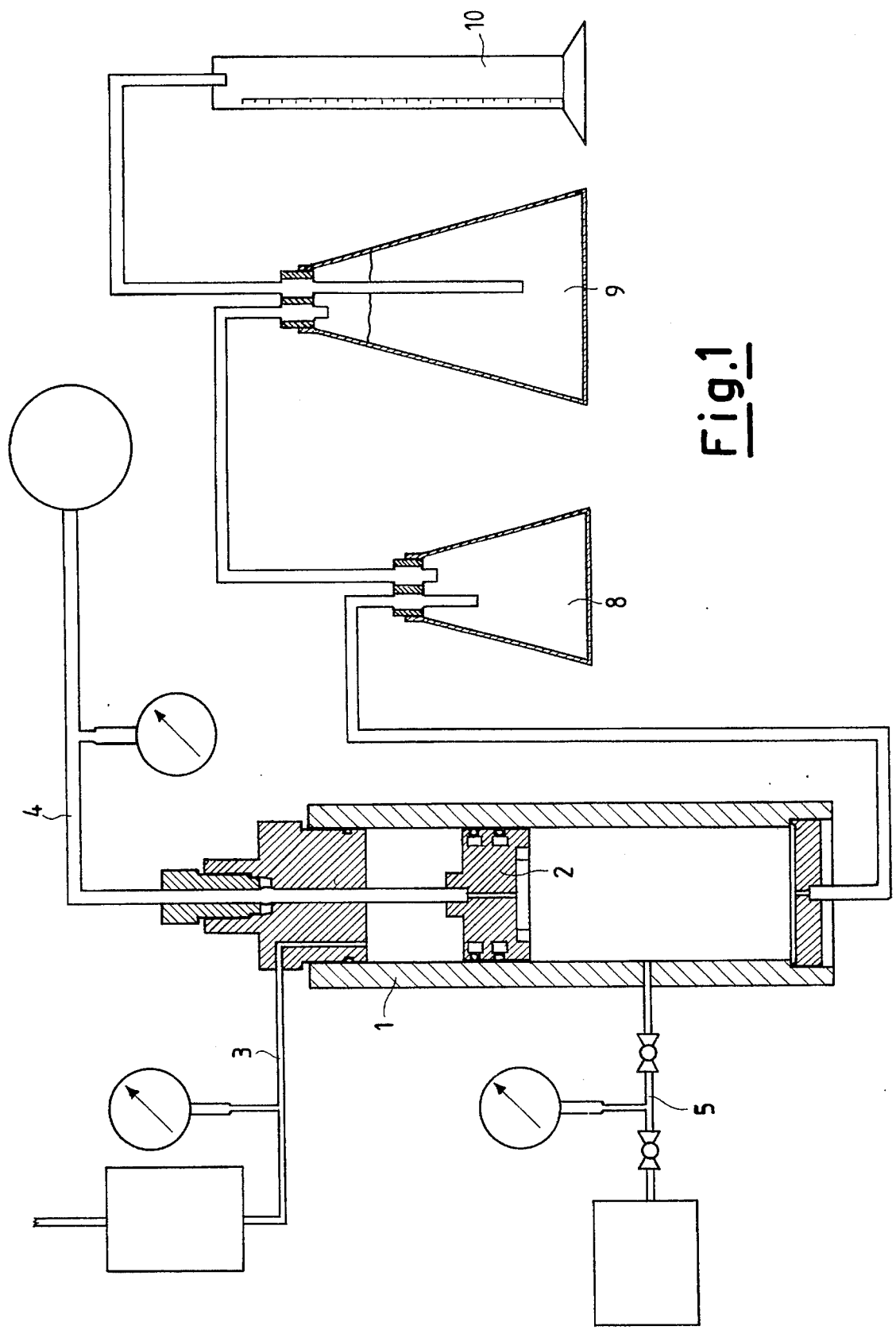

Gas migration, ie the effectiveness of the cementitious composition in preventing gas migration during and after setting, is determined using the gas flow apparatus shown schematically in FIG. 1, which reproduces on a laboratory scale the conditions under which the cementitious-composition pumped into the well exists. Specifically, the apparatus comprises a steel cylinder (1) of height 35.6 cm, inner diameter 5.41 cm and thickness 2.9 cm, in which the cementitious composition is placed. The cylinder (1) is provided with a piston (2) which is driven by applying a hydraulic pressure of 1000 psi by means of oil fed through the line (3), representing the well hydrostatic loading. Nitrogen is fed from the top of the piston via the line (4) at a pressure of 500 psi, to represent the formation pressure. The pressure transducer (5) records the hydrostatic pressure transmitted to the formation. While the cementitious composition is still fluid, the hydrostatic loading of the column formed from the composition is totally transmitted to the formation interface, the pore pressure then being equal to the piston pressure. During the setting of the cement the pore pressure falls rapidly and, if no gas passage takes place, falls to zero. If the composition is not impermeable to gas, it creates microfractures within the solid matrix and migrates towards the lower pressure regions. Correspondingly, the pore pressure tends to rise. If this reaches the value of the surrounding pressure, ie 500 psi, the gas emerges to displace the liquid present in the flask (9) into the measuring cylinder (10) in which its volume is read off. The filtrate is collected in the flask (8).

The apparatus is also provided with a temperature control device to enable the test to be conducted at the desired temperature.

The filtrate loss is determined in accordance with API SPEC 10 (5th Edition, 1 Jul. 1990), Appendix F.

The pumpability time is determined in accordance with API SPEC 10 (5th Edition, 1 Jul. 1990), Section 8. The mortar, prepared in accordance with API SPEC 10 Appendix F, is placed in a Chandler Engineering consistometer at 68° C. and 10,200 psi. During the measurement the container holding the mortar is rotated at a constant speed of 150 rpm. A blade inserted into the mortar transmits to a potentiometer connected thereto a force which when expressed as a voltage in millivolts represents the consistency variation of the mortar. The pumpability time is defined as the time between the application of the initial pressure and temperature to the cement and the attaining of 100 arbitrary consistency units (100 Bc). Under the stated temperature and pressure conditions the pumpability time must be between 3 and 5 hours.

EXAMPLE 1 (Comparative)

A high sulphate-resistant cement, G-HSR cement, is added (792 g) to an aqueous solution (349 g) containing 0.6 wt. %, with respect to the cement, of a cellulose filtrate reducer, sodium formate, sodium sulphate and a sulphonated surfactant (commercial product HALAD 322 of Halliburton). The water/cement weight ratio is 0.44 and the mortar density is 1.9 kg/dm$^3$. The mortar is prepared by mixing the components in a Blendor mixer at 4500 rpm for 15 seconds and then at 12,000 rpm for 35 seconds. In accordance with API code, the dispersion is left to cure for a time equal to the scheduled time for the consistency test (for example 44 minutes) in a consistometer at atmospheric pressure, subjected to a thermal gradient to the test value (68° C.) and then inserted into the aforedescribed gas flow apparatus at a temperature of 68° C. under a hydraulic pressure of 1000 psi and a nitrogen pressure of 500 psi. A gas passage exceeding 50 ml/min is determined after about 17 minutes.

The filtrate loss after 30 minutes at 1000 psi and 68° C. is 28 ml. The pumpability time is 200 minutes.

EXAMPLE 2 (Comparative)

A cement mortar (cement 664 g, mixing water 221 g and dispersion water 128 g) is prepared in a manner similar to Example 1 using an easily water-soluble sulphonated polymeric filtrate reducer (commercial product FL32 of Byron Jackson, added in a quantity of 1.5 wt. % on the cement).

A 45% aqueous suspension of microsilica, the commercial product DS155 of Dowell Schlumberger, is added to the resultant mortar to the extent of 20 wt. % on the cement. As there are problems in mixing cement and microsilica, a sulphonated sodium naphthalene dispersant, the commercial product CD31 of Byron Jackson, is used in a quantity of 1.5 wt. % on the cement.

Operating as in Example 1, the following results are obtained:

No gas passage during or after cement setting.

The filtrate loss after 30 minutes is 30 ml.

The pumpability time is 274 minutes.

EXAMPLE 3 (Comparative)

A cement mortar (cement 792 g, plus solution water 79 g, plus mixing water 270 g, water/cement ratio 0.44) is prepared in a manner similar to Example 2, and a 3.5 wt. % of a solution of the non-ionic surfactant nonylphenol propoxylate and ethoxylate (30 moles of propylene oxide and 70 moles of ethylene oxide) is added to the resultant mortar to the extent of 10% w/w on the cement. No dispersant is added, whereas the filtrate reducer of Example 2 is used. The temperature is fixed at 68° C.

The test using the gas flow apparatus shows that after 5 hours the piston undergoes no further movement, showing that the mortar under examination has set. Even so, the pore pressure never falls below 420 psi. This phenomenon is interpreted as a gradual filling of the solid cement matrix with gas. In this respect, a fluid stream is observed leaving the flasks at a rate of about 37 ml/minute.

The filtrate loss after 30 minutes is 34 ml.

Figure 2:
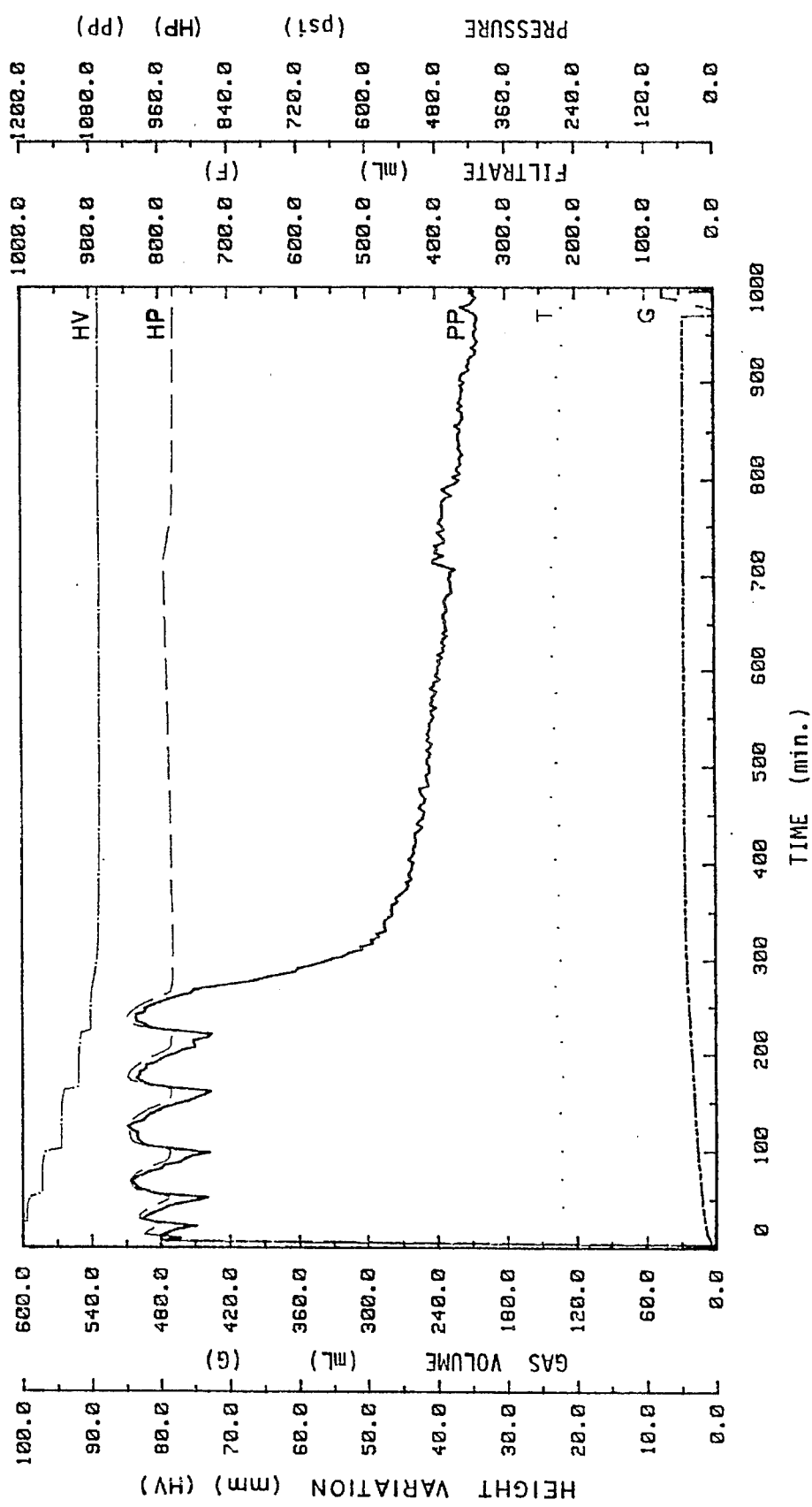
FIG. 2 is a graph showing the passage of gas with time for a cementitious composition incorporating a surfactant, in accordance with the known art.

The progress of this test is shown in FIG. 2. From this figure it can be seen that the pore pressure does not fall below 400 psi, indicating that the solid matrix is flooded with fluid.

EXAMPLE 4

In a first test, a cement mortar is prepared (cement 792 g, mixing water 270 g, total water/cement ratio 0.44) in a manner similar to Example 3; a 40 wt. % dispersion of carbon black Corax N772 in water, achieved by adding 3.2 wt. % of the surfactant of Example 3, is added to the resultant mortar to the extent of 10% (79 g) on the cement. The carbon black used is of N772 (SRF) type with a particle size (diameter) of 120 nm, a BET surface area of 33 m$^3$/g and a DPB absorption of 65 ml/100 g. The dispersion of carbon black in water is prepared by adding 40 g of carbon black to 60 g of a 3.2 wt. % aqueous solution of the non-ionic surfactant nonylphenol propoxylate (30 moles of propylene oxide) and ethoxylate (70 moles of ethylene oxide). In this manner the dispersion contains 40 wt. % of carbon black and 3.2 wt. % of surfactant.

The test using the gas flow apparatus, conducted at 38° C., shows that after 7.5 hours the mortar has set, the pore pressure has fallen rapidly to zero, and no gas passage has occurred.

The filtrate loss after 30 minutes is 16 ml.

The pumpability time is 235 minutes.

In a second test, results totally similar to the preceding are obtained using as surfactant for preparing the dispersion of carbon black in water the commercial product NPEC of ICI, consisting of nonylphenol propoxylate (13 moles of propylene oxide) and ethoxylate (175 moles of ethylene oxide).

In a third test a cementitious mortar is prepared containing 792 g of class G-HRS cement, which is dry-mixed for 30 minutes with 5.3%, w/w on the cement, of Corax N772 carbon black (41.9 g) using a Hobart laboratory cement mixer. The carbon black is covered with a thin film of non-ionic surfactant, achieved by spray-drying.

The mortar is completed by adding 349 g of demineralized water, (water/cement ratio 0.44) and 1.5%, w/w on the cement, of filtrate reducer type FL32 of Byron Jackson. As in the preceding examples, the mortar is conditioned in a consistometer under atmospheric pressure and at 68° C. for 30 minutes rotating at 150 rpm. The test with the gas flow apparatus is conducted at 68° C. and the following results are noted:

piston pressure constant at 1000 psi, gas pressure constant at 500 psi, pore pressure constant at 1000 psi until setting commences, after about 5 hours, after which it falls rapidly to zero.

The filtrate loss is 31 ml in 30 minutes.

7

The pore pressure after 24 hours is less than 100 psi, consequently the cement matrix is not flooded with fluid.

EXAMPLE 5

Cement mortar (790 g of cement and 270 g of mixing water) with added carbon black (79 g of dispersion) as in Example 4 is used, but at a temperature of 68° C.

The test using the gas flow apparatus shows that after about 6 hours the mortar has set, the pore pressure falling rapidly to zero without further rising, and with no gas passage occurring. The filtrate loss after 30 minutes is 22 ml, which is less than that found with silica, other conditions being equal. The pumpability time is 200 minutes.

Figure 3:
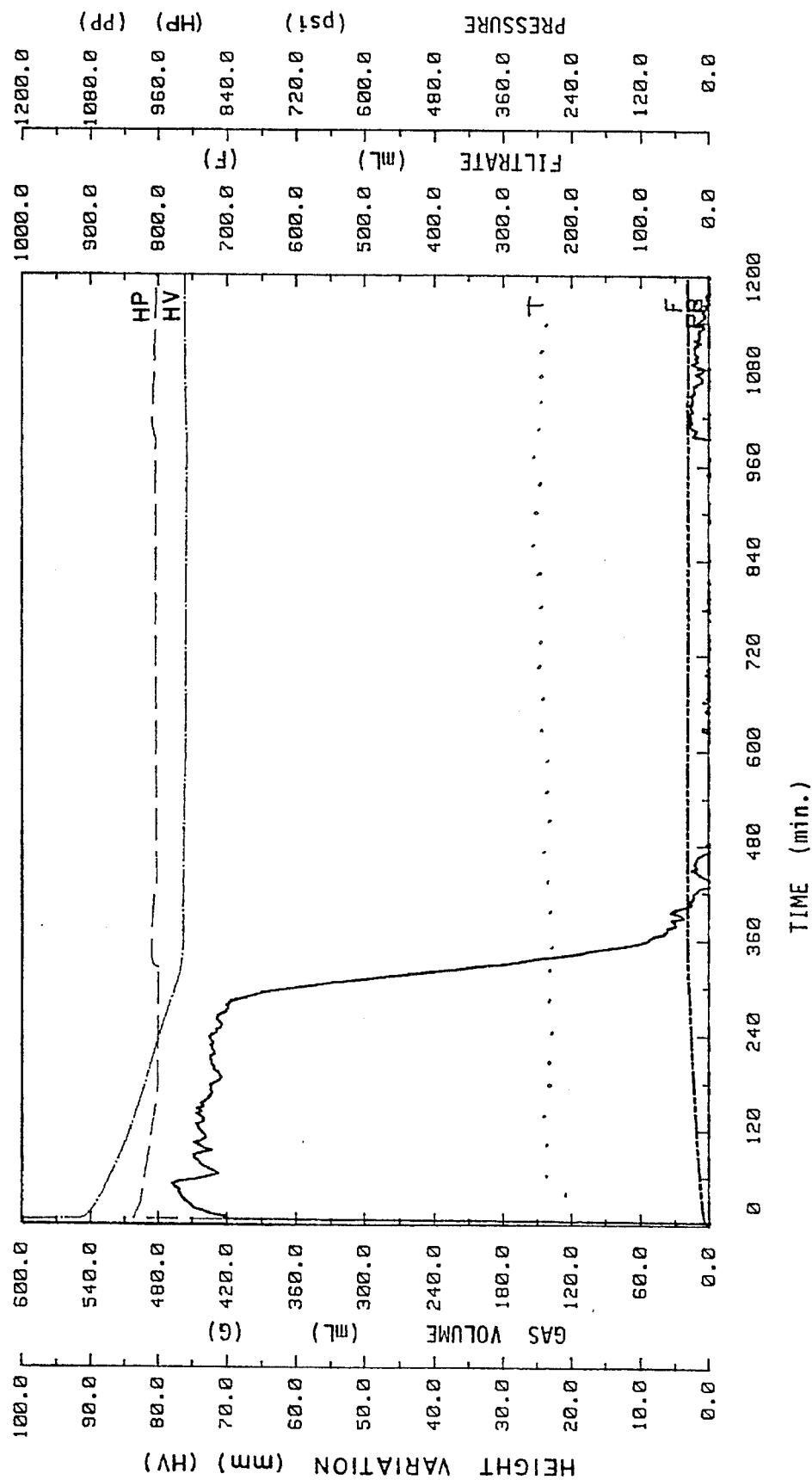
FIG. 3 is a graph showing the non-passage of gas with time for a cementitious composition incorporating carbon black and a non-ionic surfactant in accordance with the present invention, as described in Example 5.

The progress of this test is shown in FIG. 3. This figure shows the reduction of the pore pressure to zero during cement setting, and that after 20 hours there is no fluid passage.

EXAMPLE 6

Cement mortar (790 g of cement and 270 g of mixing water) with added carbon black (79 g of dispersion) as in Example 4 is used, to which 2%, w/w on the cement, of a filtrate reducer, namely the commercial product FL32 of Byron Jackson, is added and the test temperature raised to 80° C.

The test using the gas flow apparatus shows that after about 5 hours the mortar has set without any gas passage being observed.

The filtrate loss after 30 minutes is 11.6 ml.

EXAMPLE 7

A cement mortar is prepared containing 792 g of G-HSR cement, 270 g of demineralized water and 10%, w/w on the cement, of a dispersion containing Elftex carbon black (Cabot Co.) dispersed with the commercial anionic dispersant Daxad in a quantity of 8 wt. % on the carbon black (total water/cement ratio 0.4). 1.5%, w/w on the cement, of FL2 filtrate reducer, a commercial product of Byron Jackson, is added to the cement mortar.

The test temperature is fixed at 68° C. The results of the test (FIG. 4), conducted as in the preceding examples, were as follows: the pore pressure remained constant at the initial value of 1000 psi until the cement began to set, which occurred about 6 hours after mixing, after which it fell rapidly to zero. This pressure then remained constant at zero for a further 6 test hours, indicating that there was no gas passage.

The mortar volume reduction was about 7% of the initial volume. Pumpability exceeded 180 minutes at 10,200 psi, and the filtrate loss in 30 minutes was 48 ml.

EXAMPLES 8–10

These examples are given to indicate the on-site applicability of the method of the present invention, using specifically carbon black dispersed in water in the presence of a sulphonated dispersant.

The said formulations were prepared at the same density (1.9 g/cm$^3$), varying the water/cement ratio each time.

For this purpose the formulations of these examples were subjected to further characteristics determinations, namely:

8 rheological measurements with a FANN 35 viscometer (see Table 1) at a temperature of 25° C. (Ex. 8–10, comparative Example 11) and 68° C. (Ex. 8A–10A and comparative Example 11A);

compression strength development tests in a UCA (ultrasonic cement analyzer) cell at 68° C. and 10,200 psi pressure;

gas flow apparatus tests also at 90° C., using in this case a high temperature Geoterm cement of 3.01 g/cm$^3$ density and omitting the setting retardant.

EXAMPLE 8

A cement mortar is prepared containing 792 g of G-HSR cement (density 3.22), 278 g of demineralized water (total water/cement ratio 0.47) and 10%, w/w on the cement, of an aqueous dispersion of carbon black (Corax N-772 of PCBI) dispersed with a naphthalenesulphonic acid/formaldehyde condensate anionic dispersant. The dispersant is present in a quantity of 8 wt. % on the carbon black and 0.3 wt. % on the cement.

A commercial filtrate reducer, namely FL19L of Byron Jackson, is added (4 wt. % on the cement) to the cement mortar, not containing the commercial dispersant normally used in its formulation, together with 0.5 wt. %, on the cement, of a lignosulphonate setting retardant.

The mortar, of 1.9 g/cm$^3$ density, is then mixed in a container in accordance with API SPEC 10 Appendix F and characterised in accordance with API rules.

Figure 4:
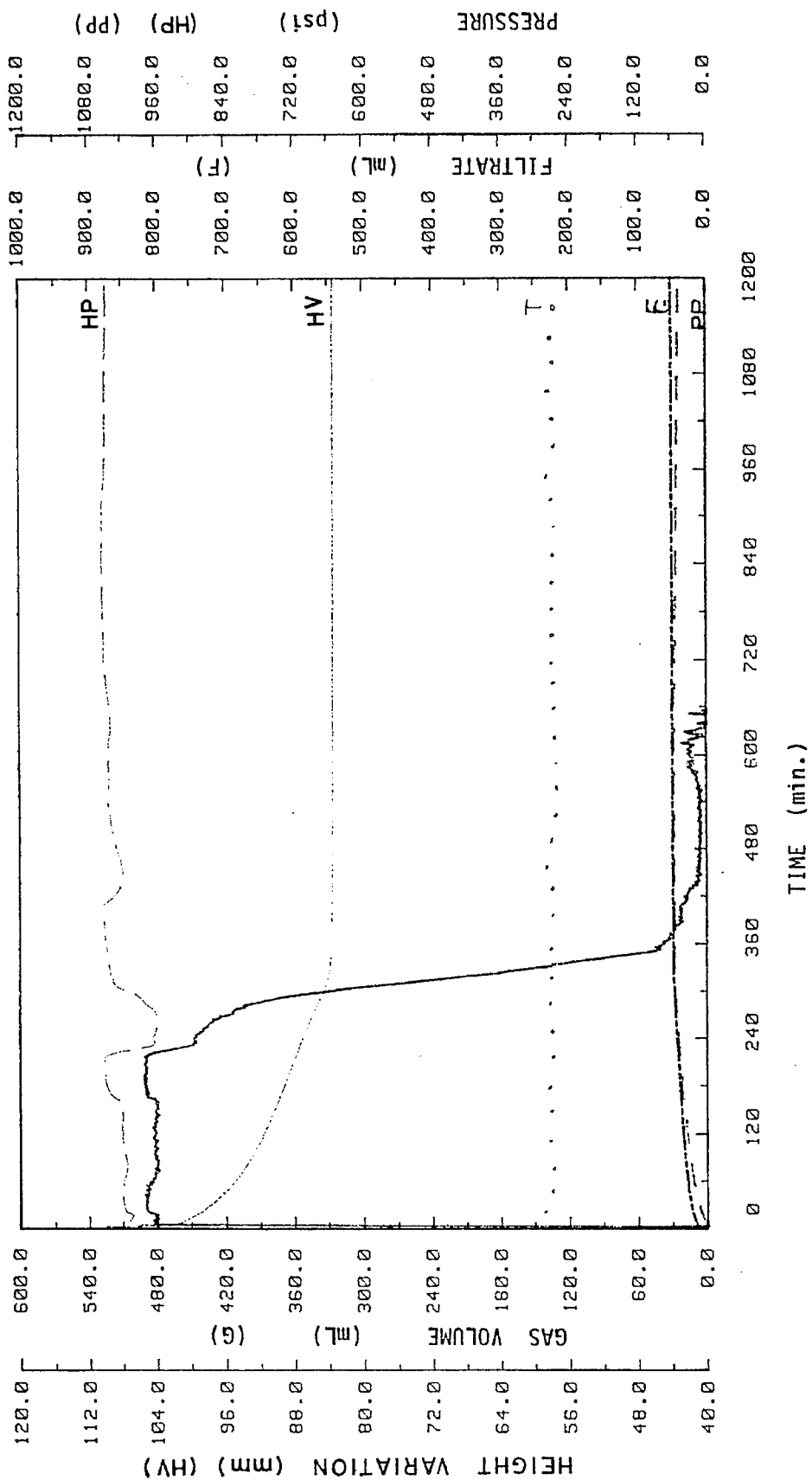
FIG. 4 is a graph showing the non-passage of gas with time for a cementitious composition incorporating carbon black and a commercial dispersant deriving from naphthalenesulphonic acid/formaldehyde condensation, as described in Example 7.

The results, excluding the theological properties shown in Table 1, are as follows:

pumpability at 68° C. 338 minutes, acceptable for on-site use, sedimentation test: no sediment, filtration test: 36 cc in 30 minutes (value scheduled for on-site use 50 cc in 30 minutes), gas flow apparatus test: the data of FIG. 4 relating to Example 7 are confirmed, ie after about 5 hours the mortar begins to set and the pore pressure falls virtually to zero without further rising, and there is no gas passage, compression strength: compression strength was 108 kg/cm$^2$ after 8 hours and 218 kg/cm$^2$ after 24 hours.

EXAMPLE 8A

A formulation equal to that described in Example 8 is prepared, but replacing the G-HSR cement with Geoterm high temperature cement of 3.01 g/cm$^3$ density, and using no setting retardant (total water/cement ratio 0.47).

The cement mortar is tested in the gas flow apparatus at 90° C.

The results of this test show that the mortar begins to set after about 6 hours and the pore pressure decreases rapidly to zero, remaining at this value for more than 10 hours. There was no gas passage and the filtrate loss was 38 cc in 30 minutes.

EXAMPLE 9

A mortar was prepared as in Example 8 by mixing 792 grams of class G-HSR cement with 278 grams of demineralized water (total water/cement ratio 0.47). 79 grams of an aqueous 40 wt. % carbon black dispersion are added to the mix, the carbon black amounting to 4% w/w on the cement, and dispersed by the sodium salt of the anionic dispersant described in EP-A-379,749, ie the sulphonated dispersant obtained by oxidative $SO_3$ sulphonation of fuel oil from steam cracking.

The dispersant is present in the carbon black dispersion in a quantity of 2.5 wt. % on the carbon black (0.1 wt. % on the cement). A filtrate reducer of the type described in Example 8 is then added to the mix to the extent of 4 wt. % on the cement.

Figure 5:
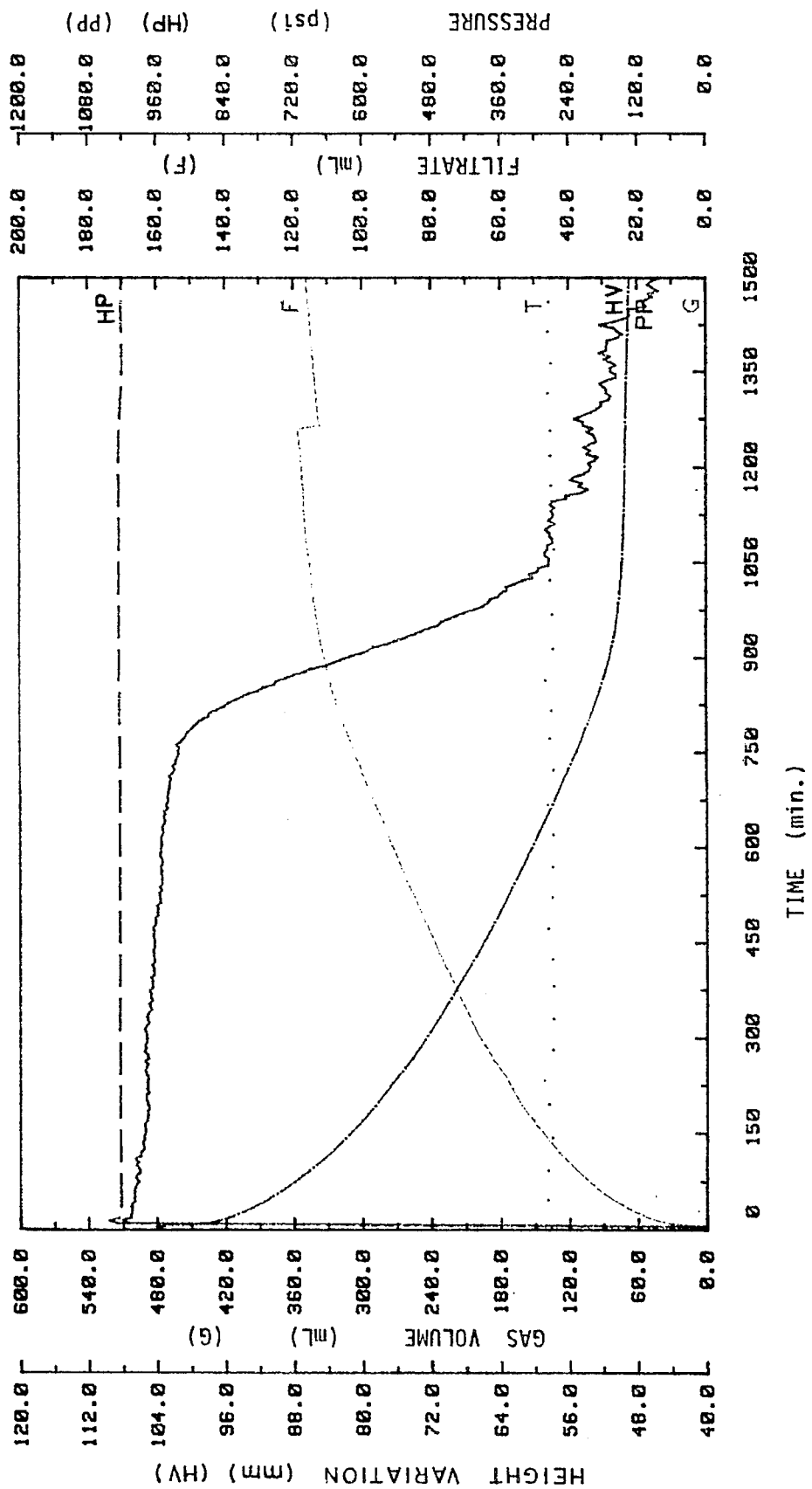
FIG. 5 shows the same graph but referred to Example 9, in which the dispersant used is the sodium salt of the dispersant obtained by oxidative $SO_3$ sulphonation of fuel oil from steam cracking.

The test results are as follows:

pumpability at 68° C. 185 minutes, sedimentation test: no sediment, filtration test: 55 cc in 30 minutes, gas flow apparatus test (FIG. 5): after about 13 hours the mortar begins to set and the pore pressure tends rapidly to zero without further rising, and there is no gas passage, compression strength: 75 kg/cm$^2$ after 8 hours and 240 kg/cm$^2$ after 24 hours.

EXAMPLE 9A

A formulation equal to that described in Example 9 is prepared, but replacing the G-HSR cement with Geoterm high temperature cement of 3.01 g/cm$^3$ density, and using no setting retardant (total water/cement ratio 0.47).

The cement mortar is tested in the gas flow apparatus at 90° C. The results of this test show that the mortar begins to set after about 8 hours and the pore pressure decreases rapidly to zero, remaining at this value for more than 10 hours. There was no gas passage and the filtrate loss was 40 cc in 30 minutes.

EXAMPLE 10

A sulphonated dispersant based on fuel oil from steam-cracking (FOK) produced at Priolo was prepared. Said FOK had the following composition by weight:

| | |
|---|---|
| aromatics | 97.6% |
| saturated | 1.2% |
| polar | 1.2% |

Said FOK was first oligomerized and then sulphonated in an autoclave having a 1 liter capacity thermostated with circulating water.

Preparation of the Oligomer 625.2 g of FOK and 3.5 g (0.036 mols) of $H_3PO_4$, 99 wt. %, are charged in the open autoclave at atmospheric pressure. The autoclave is closed and the seal test is carried out with nitrogen at 10 kg/cm$^2$. Then the nitrogen is degassed, and the $BF_3$ cylinder previously weighed ($BF_3$ titer>99%) is connected to the open autoclave and is pressurized up to 6.8 kg/cm$^2$.

The mixture contained in the autoclave is stirred (765 rpm) and a temperature increase from 14° to 38° C. in 2 minutes can immediately be noted; the pressure decreases from 6.8 to 2.2 kg/cm$^2$.

Then the autoclave is heated (from 38° to 69° C. in 28 minutes) and is let to react under stirring for 120 minutes at 68°–70° C. After a 30 minutes reaction, the pressure turns out to be of 0.9 kg/cm$^2$ and after 150 minutes of 0.3 kg/cm$^2$ at 70° C.

At 70° C. the autoclave is degassed and reclaimed. 625 g of FOK oligomerized are recovered. The molecular weight of FOK oligomerized resulted to be 2.7 times higher than that of the starting FOK.

Preparation of the Sulphonate

The autoclave having a 1 liter capacity is charged with 224.8 g of FOK oligomerized and then with 540 g of liquid $SO_2$ (titer>99%). Then the reactor is fed with 203.5 g of $SO_3$ distilled from oleum at 65% of $SO_3$. The reaction mixture temperature is kept between 12° and 30° C.

After 180 minutes the sulfonic acids so produced are neutralized with 935.1 g of a solution containing 18.3 wt. % of NaOH. 2524.4 g of an aqueous solution of neutralized sulfonate (pH 8.27 at 29° C.) is obtained.

The resulting aqueous solution is then lyophilized and 587.1 g of crude product is obtained, said crude product having the following composition:

| | |
|---|---|
| $Na_2SO_3 + Na_2SO_3$ | = 14.0% |
| $H_2O$ | = 6.6% |
| active part | = 79.4% |

Such a dispersant was used for the preparation of a cement mortar in accordance with Example 8 and with the quantities disclosed therein.

Carbon black (4 wt. % on the cement) was added to the mixture after dispersal in water by said dispersant.

The dispersant quantity is 5 wt. % on the carbon black and 0.12 on the cement, the water/cement ratio being 0.47.

FL 19L filtrate reducer is also added to the extent of 3 wt. % on the cement.

The test results were as follows:

pumpability at 68° C. 225 minutes, sedimentation test: no sediment, filtration test: 39 cc in 30 minutes, gas flow apparatus test: after about 15 hours the mortar begins to set and the pore pressure tends rapidly to zero without further rising; no gas passage was recorded, compression strength: 90 kg/cm$^2$ after 8 hours and 220 kg/cm$^2$ after 24 hours.

EXAMPLE 10A

A formulation equal to that described in Example 10 (water/cement ratio 0.47) is prepared, but replacing the G-HSR cement with Geoterm high temperature cement of 3.01 g/cm$^3$ density, and using no setting retardant.

Only the theological properties are evaluated for this formulation. (Table 1).

EXAMPLE 11 (Comparative)

A silica-containing mortar is prepared by mixing together:

G-HSR cement: 792 grams;

fluidifier, sulphonated sodium naphthalene condensed with formaldehyde: 0.9% on the cement;

FL 19L filtrate reducer: 2.5 setting retardant: 0.4 wt. %;

compression strength: 40 kg/cm$^2$ after 8 hours and 220 kg/cm$^2$ after 24 hours.

The prepared mixture has a water/cement ratio of 0.495 and a density of 1.9 g/cm$^3$.

It should be noted that this formulation, with the same density as formulations 8–10, has a water/cement ratio much higher than formulations 8–10.

The rheological properties are given in Table 1, in which Ex. 11A indicates rheological properties measured at 56° C. on the mixture of Example 11.

TABLE 1

| | RHEOLOGICAL PROPERTIES | | | | | | | |
|---|---|---|---|---|---|---|---|---|
| Reading rpm | Ex 8 | Ex 8A | Ex 9 | Ex 9A | Ex 10 | Ex 10A | Ex 11 | Ex 11A |
| 600 | 122 | 81 | 184 | 100 | 128 | 68 | 125 | 122 |
| 300 | 68 | 46 | 109 | 59 | 74 | 38 | 67 | 63 |
| 200 | 47 | 33 | 79 | 43 | 52 | 27 | 51 | 45 |
| 100 | 26 | 20 | 46 | 26 | 30 | 15 | 32 | 26 |
| 60 | 18 | 14 | 32 | 18 | 20 | 10 | — | — |
| 30 | 11 | 9 | 20 | 12 | 13 | 6 | — | — |
| g.10s | 2 | 4 | 3 | 4 | 3 | 1 | — | — |

Examples 8–10 and Table 1 show that the use of carbon black in aqueous dispersion in the presence of a sulphonated dispersant has the following advantages compared with the use of the microsilica described in prior art Example 2:

in formulating mortars of equal density (1.9 kg/cm$^3$) the water content can be substantially reduced; in this respect the water/cement ratio falls from 0.495 of Example 11 to 0.47;

rheological properties of the formulation with silica are virtually equal to the formulations of the present invention, but to the detriment of the water content;

possibility of excluding the superfluidifier from the formulation while maintaining all technological properties unaltered;

better mechanical properties of mortars.

We claim:

1. A cementitious composition for oil well cementation able to prevent fluid migration, consisting essentially of water, hydraulic cement and carbon black, this latter dispersed with the aid of a surfactant or an organic dispersant, the carbon black quantity varying from 2 to 20 parts per 100 parts of the hydraulic cement w/w.

2. A composition as claimed in claim 1, characterised in that the surfactant is chosen from non-ionic surfactants.

3. A composition as claimed in claim 1, characterised in that the carbon black is predispersed in water with the organic dispersant or with the surfactant, used in a quantity from 2 to 10 parts per 100 parts of carbon black w/w, the dispersion obtained in this manner being added to and homogenized with the water and the hydraulic cement, or alternatively the aqueous dispersion containing the organic carbon black and the dispersant or surfactant is dried, and the carbon black treated in this manner is added to and homogenized with the water and the hydraulic cement.

4. A composition as claimed in claim 1, characterised in that said carbon black is a furnace black, a gas black or a thermal black having an average particle size from about 10 to about 200 nm, a BET surface area from about 10 to about 155 m$^2$/g, and a DBP absorption from about 65 to about 125 ml/100 g.

5. A composition as claimed in claim 4, characterised in that said carbon black has an average particle size from about 60 to about 200 nm and a BET surface area from about 15 to about 40 m$^2$/g.

6. A composition as claimed in claim 1, characterised in that the organic dispersant is chosen from sulphonated anionic dispersants.

7. A composition as claimed in claim 6, characterised in that the sulphonated anionic dispersant is chosen from alkaline metal, alkaline-earth metal or ammonium salts of:

a) sulphonates of high molecular weight, obtained by sulphonating polynuclear aromatic compounds and condensing the resultant sulphonation product with formaldehyde;

b) sulphonates obtained by oxidative sulphonation with sulphur trioxide of fuel oil deriving from steam cracking;

c) sulphonates deriving from sulphonation of indene or its mixtures with aromatics;

d) sulphonates deriving from sulphonation of indene-cumarone resins;

e) sulphonates deriving from oligomerization of fuel oil from steam cracking followed by sulphonation of the oligomers obtained.

8. A composition as claimed in claim 1, characterised by a ratio of water to cement varying between 0.40 and 0.55, a carbon black content from 3 to 5 parts per 100 parts of cement w/w, and an organic dispersant or surfactant content from 7 to 9 parts per 100 parts of carbon black w/w.

9. A composition as claimed in claim 8, characterised in that the water/cement ratio is between 0.45 and 0.50.

10. A method for oil well cementation, consisting of positioning the cementitious composition in accordance with any of the preceding claims within the interspace between the well wall and the lining pipe and causing it to harden therein.

\* \* \* \* \*